F. W. KREMER.
METHOD FOR PRODUCING TIRES.
APPLICATION FILED MAR. 6, 1916.

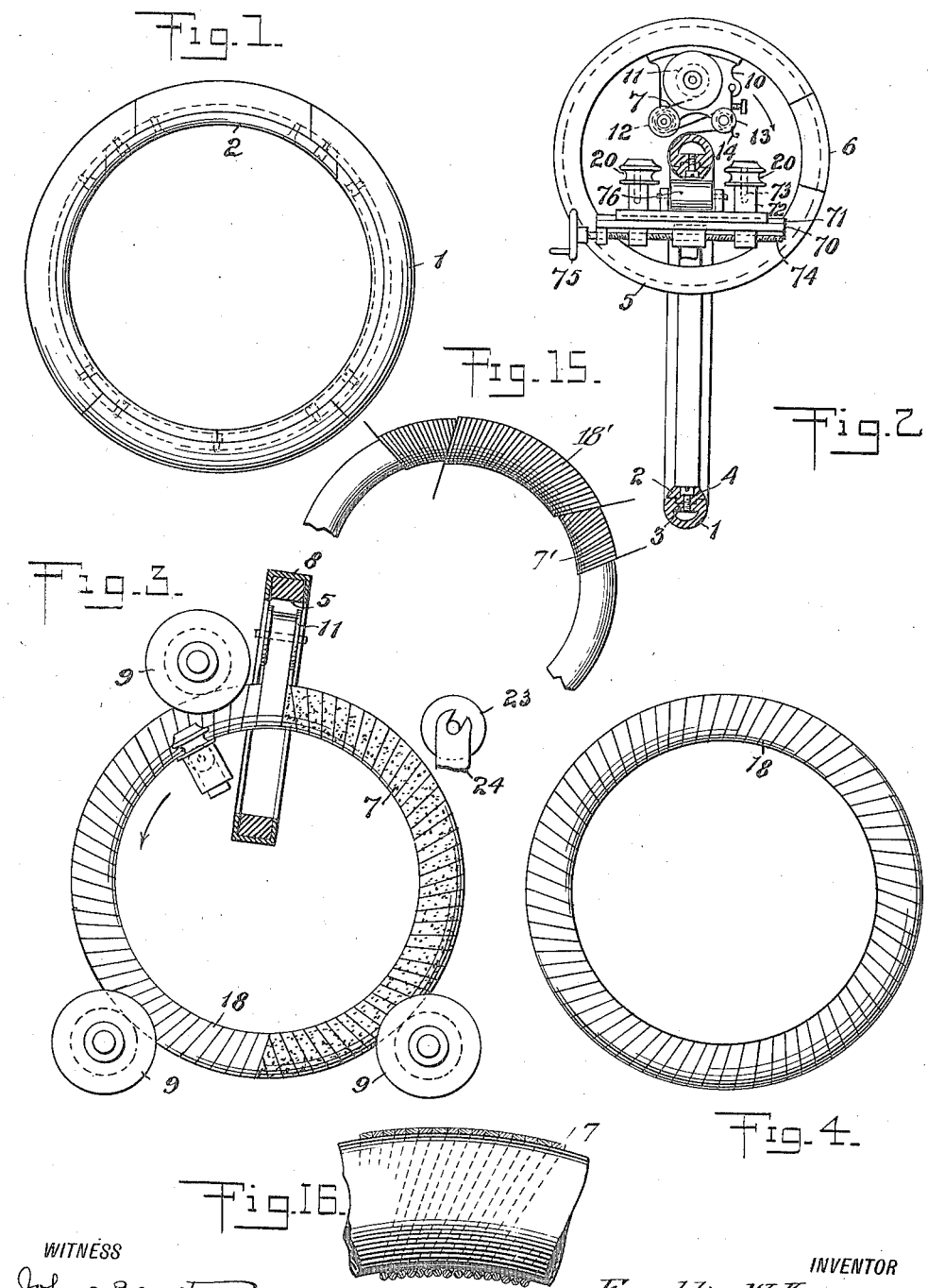

1,248,871.

Patented Dec. 4, 1917.

WITNESS
Joshua Bergstrom

INVENTOR
Franklin W. Kremer
BY
W. H. C. Clarke
ATTORNEY

F. W. KREMER.
METHOD FOR PRODUCING TIRES.
APPLICATION FILED MAR. 6, 1916.
1,248,871.
Patented Dec. 4, 1917.
3 SHEETS—SHEET 3.
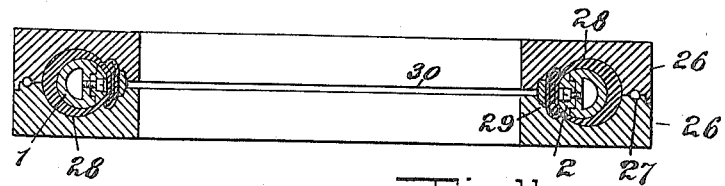
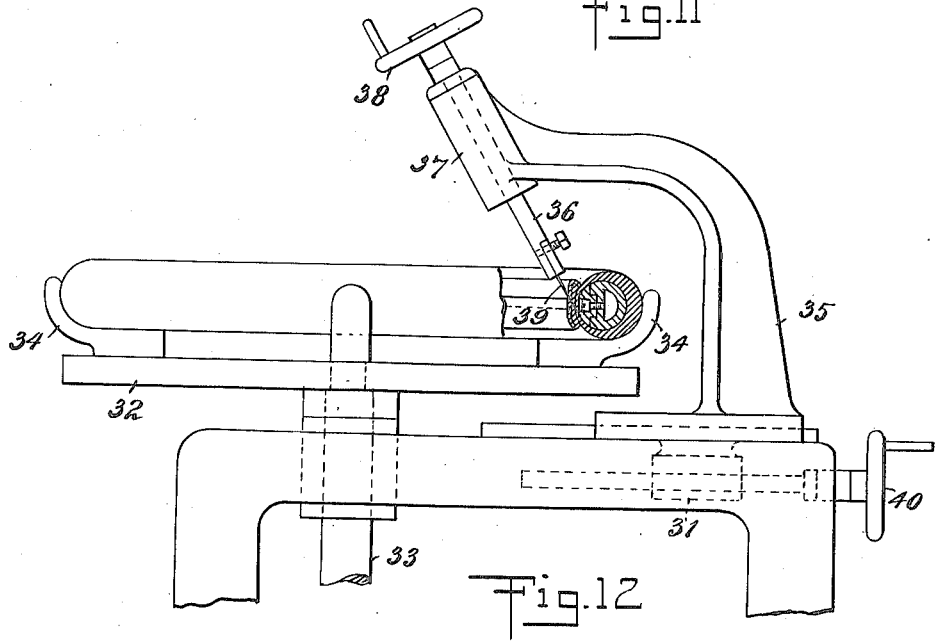
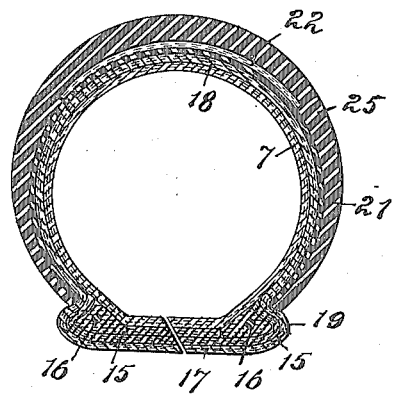
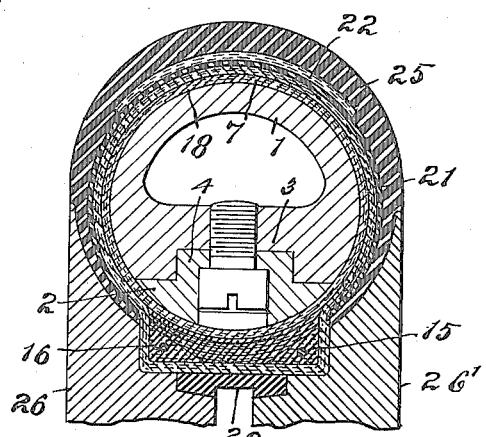
WITNESS
Johna Bergstrom
INVENTOR
Franklin W. Kremer.
BY
W. H. C. Clarke
ATTORNEY

UNITED STATES PATENT OFFICE.

FRANKLIN W. KREMER, OF CARLSTADT, NEW JERSEY.

METHOD FOR PRODUCING TIRES.

1,248,871.    Specification of Letters Patent.    Patented Dec. 4, 1917.

Application filed March 6, 1916. Serial No. 82,445.

*To all whom it may concern:*

Be it known that I, FRANKLIN W. KREMER, a citizen of the United States, residing at Carlstadt, in the county of Bergen and State of New Jersey, have invented new and useful Improvements in Methods for Producing Tires, of which the following is a specification.

My invention relates to improvements in tires for automobiles and other motor vehicles; and embodies a novel method of construction of the same.

Tires for motor vehicles have heretofore been produced for the most part by applying strips of suitable rubber coated fabric to ring-shaped cores which are round in cross section; and sprinning the ends of the fabric to produce the beads of the tire and give them their proper shape. By this method the fabric is placed longitudinally upon the core; and in order to provide the rounded tread or shoe of the tire as well as the beads along its inner edges it has been found necessary to stretch the fabric along its longitudinal median line and to full it in along its lateral edges. Thus the difference between the external and internal diameter of the core is taken into account and the fabric or web is shaped to correspond as nearly as possible with the contour of the core and the general configuration of the tire which is to be made.

Such a method, however, produces unequal strains in the fabric or web; and by it a tire of uniform strength cannot possibly be obtained. This is because only that portion of the fabric comprising the greater diameter or tread portion of the tire is stretched or in tension; whereas that portion of the fabric forming the sides and base of the tire is practically under no longitudinal tension, but fulled in instead. Thus it is obvious that only that portion of the fabric (which is practically only one-half of the tire area) which is in actual tension is utilized to withstand or resist the internal pressure incident to inflation, and the stress encountered in actual service; which is just the reverse of what practical conditions of service demand.

In tires made according to my invention I seek to eliminate the above disadvantages and objections by applying the fabric to a core in a manner that will eliminate unequal stress and afford a tire that will be of uniform strength throughout; whereby greater durability and length of life can be realized.

I employ a ring shaped core upon which the tire is built or formed, and I preferably apply the fabric which makes up the body of the tire, to this core by winding the same about it in a sufficient number of layers in both directions; whereby I am enabled to provide a tire of exceedingly great strength and resistance no matter in what direction stresses are applied to the same. The core also receives the necessary layers of rubber to complete the body of the tire; and then the tire with the core bearing it is placed in a suitable mold, vulcanized and later finished.

The following description, taken in connection with the drawings sets forth an embodiment of the principle of my invention; but the disclosure herein is illustrative only and other embodiments than the one shown may be employed. In other words, I reserve the right to make changes in the construction of my tire; as well as in the construction and mode of operation of the apparatus by which the process and manner of producing the tire are practised; and differences in the phrasing of the claims are intended to cover actual differences in the concrete embodiments of my invention to the full extent indicated by the meaning of the terms in which the claims are expressed.

On the drawings:

Figure 1 is a side view of a core employed in the practice of my invention;

Fig. 2 is a sectional view of such a core in combination with means for beginning the formation of a tire thereon;

Fig. 3 is a side elevation partly in section, showing an early stage in the making of a tire according to my invention;

Fig. 4 is a view of the core shown in Fig. 1 when the same has been wound with more fabric to form the body of the tire thereon;

Fig. 11 is a cross section of the mold in which the vulcanizing of the tire is effected;

Fig. 12 is a side view partly in section, showing how the tire is finished and removed from the core;

Fig. 13 is a cross sectional view showing the tire when built;

Fig. 14 is a view similar to Fig. 11 showing a straight-walled mold;

Fig. 15 is a diagrammatic view to show a modified method of producing my improved tire;

Fig. 16 is a view of part of the core showing how certain physical changes in the shape of the fabric making up the body of the tire must be secured in order to utilize the construction shown in Fig. 15.

The same numerals of reference are used to indicate the same parts on all the views.

Figure 5:
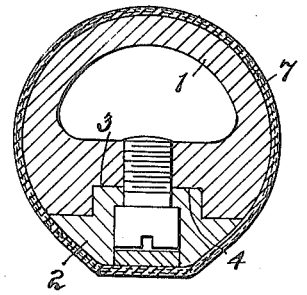
Figs. 5, 6 and 7 are cross sectional views through the core of Fig. 1 showing various stages in the operation of building a tire upon the same.

In the particular description of my invention, I employ an annular core, shown by itself in Fig. 1, in building up the body of the tire by winding the core with tape or cord. This core comprises outer arc shaped sections 1 and inner arc shaped sections 2; the former having an inside groove 3 and the latter having an outside rib 4 to fit the groove and enable the sections to build up a complete ring, having a contour to conform to the interior surface of the tire. The inner sections 2 will overlap the abutting ends of the outer sections 1 and be fastened thereto by suitable screws. This core will revolve around its center like a wheel around an axle while being wound or wrapped, so as to be completely covered throughout. For this purpose the core will be mounted so as to have no translational movement while it is revolving, and it will pass through a circular frame 5 having a removable section 6, which when taken out will provide a space through which the core can be passed in order to get the core and frame 5 in proper relative positions. As illustrated in Fig. 2, the rim of the core will be located at about the center of the frame 5 and as the core revolves each successive portion thereof will pass through the frame 5 in line with the middle of the same.

In operation, the frame 5 will revolve in a plane corresponding to the plane of the sheet of drawing bearing Fig. 2; and the core will revolve in a plane at right angles thereto. The frame will carry a reel of tape 7 which will be paid out as the core and frame rotate, and thus the whole exterior of the core will be covered.

The frame 5 will be mounted in a channel-shaped circular casing or guide shown at 8 in Fig. 3, and the core itself while being wrapped will be supported upon concave anti-friction rollers 9. This guide 8 may be built up sectionally to enable it to be quickly and readily fitted over the frame 5 when the latter is to be mounted, and the frame 5 will carry on the inside thereof a projection 10 rigid with the frame 5 on which is attached the reel 11 for the tape 7. The projection will also carry a guide roller 13 which may be pressed down by an adjustable arm 14, that may be a resilient spring, if desired; and that is designed to exert a brake action on the tape and prevent it from being paid out too rapidly.

It will be clear from the description, as far as the same has now proceeded, that with the frame 5 and core in the relative positions portrayed in Fig. 2 and revolving steadily, but without translational movement, the tape will be wrapped spirally around the core; and with the core turning as indicated by the arrows in Fig. 3; and the top of the frame 5 moving in a direction away from an observer viewing the same figure in front the turns of the tape will run from left to right, beginning at the top of the core, passing around the same in a clockwise direction. As many layers of tape can be wound on the core in this direction as necessary and the numeral 7 will hereafter be applied to these original layers. When these layers are put on, the frame 5 will incline from left to right; and after the original layers 7 are applied, another set of layers is wound over them; but in this case the frame 5 is caused to incline from right to left instead. While these layers are being put on, the core will rotate in opposite directions, one of which is indicated by the arrows in Fig. 3; and the other will be the reverse thereof. When the original layers 7 are applied the core will turn clockwise, and then counter-clockwise for the next set of layers. The frame 5 will of course always rotate in the same direction, which may be taken as carrying the top of the frame 5 in Fig. 3 away from the observer and the bottom toward him; but by changing the inclination of the frame 5, the slope of the tape wound on the core is similarly changed. In other words, the original layers 7 will have the same direction in passing around the core in a counter-clockwise direction as the threads of a right handed screw, while the next set of layers, to be subsequently referred to, will have the same spiral direction as threads of a left handed screw.

The two layers or sets of layers shown in Fig. 3 are thus wound upon the core in reverse directions. This gives a trussed effect; and when the tire is placed on a wheel all stresses can be advantageously resisted no matter in what direction the wheel may be revolving.

Figure 6:
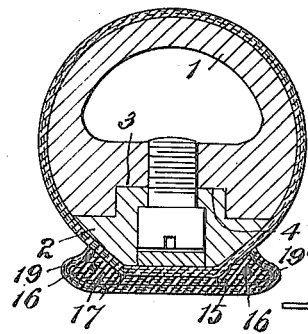
Figure 7:
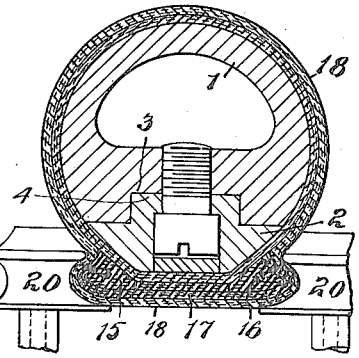

In Fig. 5 I show a cross section of the core with the original layer or layers 7 thereon, and in Fig. 7 I show the core with both the original layers and the subsequent layer or layers wound over it. Before the subsequent layer is placed on the core, however, I apply to the core a pair of rings 15 having annular reinforcements 16 embedded therein. These rings may be of rubber and they are located in position to form the beads of the tire. After applying them to the core outside the original layer 7 in proper position, I cover them with frabric 17; see Fig. 6; and over the original layer, the rings 15 and the fabric 17, the subsequent layers 18 above referred to are wound. The tire is then worked to form beads 19 by means of concave rollers 20; which engage each side of the tire along the inside of the core and give the beads their proper shape.

Figure 9:
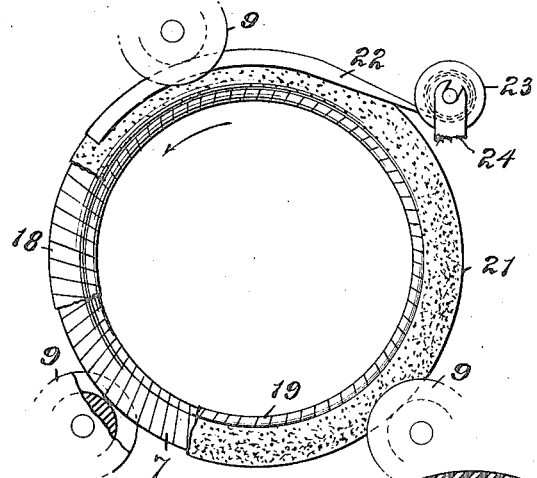
Fig. 9 is a side view illustrating certain steps in the making of my tire so as to advance it to the stage of completion referred to in Fig. 8.
Figure 8:
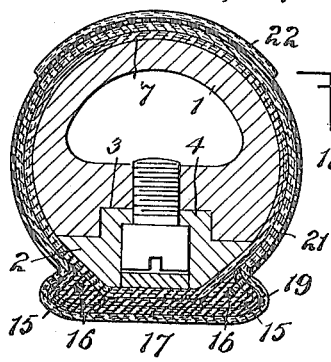
Fig. 8 is a cross sectional view showing a further stage in the making of my improved tire.
Figure 10:
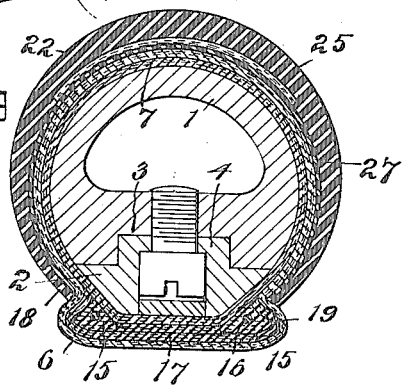
Fig. 10 is a cross sectional view of the core with the tire thereon with the same ready for vulcanizing and finishing.

The next step in the operation of building my improved tire consists in applying to the outer face of the subsequent layer 18 a strip of rubber 21 which extends from one of the beads 19 transversely around the tire to the other bead. This rubber layer is properly stretched and shaped; and I then apply to the portion of this layer 21 covering the outer part or tread of the tire a facing strip 22, which is laid on circumferentially as shown in Figs. 8 and 9. This strip 22 will be delivered by a reel 23 supported by suitable means indicated at 24, in Fig. 9; and when it is in place the main rubber layer 25 is applied. This main layer is shown in cross section in Fig. 10 and is of suitable thickness; and, like the layer 18, it extends transversely around the tire from one bead to the other.

My improved tire has now reached a point at which it can be vulcanized. To effect this I place it in a mold consisting of two annular sections 26; adapted to fit together. Two registering grooves 27 in the rings 26 will make an overflow chamber to receive any excess rubber. The adjacent faces of these sections 26 also have grooves 28 corresponding in shape to the sides of the tire and providing when the sections are together a suitable mold cavity. Each of these grooves has an annular shoulder to receive a ring 29 and between this shoulder and the inner edges of the sections 26 the sections will be spaced apart as shown at 30. A small space is thus provided extending from the inside of the sections 26 to the ring 29, but the tire structure is entirely closed by the mold. The core on which the tire is built thus "floats", so to speak in the mold and when steam or some other suitable agent is applied the tire will be vulcanized.

After vulcanizing, the sections 26 are separated, and the tire together with the core is taken out. The core is removed by cutting the tire on the inside between the beads, and for this purpose any suitable means may be employed.

As seen in Fig. 13 the cut will extend through the base of the tire in a diagonal direction, and when made will enable the tire to be stripped off the core. This tire can be mounted on a wheel with the usual inner tube inside of it and when inflated this inner tube will engage the inner portion of the base of the tire on each side of the cut and press them tightly against the wheel rim. Hence the tire will be held on the wheel not only by the usual clencher rims which engages the rim 19, but also by the action of the inner tube and the base of the tire itself coöperating in this way.

Fig. 14 shows a modified form of mold in which the cavity receiving the tire is not entirely inclosed. It is for curing a wrapped tread with "open" heat. This mold comprises sections 26' having their outer or circumferential faces shaped to fit the contour of the inner half of the tire; and can be used when the beads at the base of the tire are intended to have a different shape instead of projecting outward, as shown in Figs. 7 and 8, 10 and 13. After vulcanizing in this mold and removing the tire the core is taken out by cutting the tire as above set forth.

In the foregoing description my process is carried out by utilizing fabric which is substantially flat, such as tape, to wind around the core on which the tire is built. I may also utilize cord, but in order to build up a tire with such material the above process must be modified, because of the fact that the outside circumference of the tire is greater than the inside circumference. Consequently when cord is used the width of the cord must be varied; and this variation must be uniform around the tire. In other words, on the inside of the tire the cord may be thick and narrow; while the portions of the cord which lie across the tread should be wider and less thick; as illustrated in Fig. 16. Hence it is necessary to flatten out, so to speak, successive portions of the cord, so as to make the same cover the core completely and leave no intervening spaces between the successive turns.

Having described my invention, what I believe to be new and desire to secure and protect by Letters Patent of the United States is:

1. A process of making a tire which consists of forming the same on a collapsible core, then vulcanizing, then slitting the vulcanized tire, circumferentially, at the inner side of the core, and finally withdrawing the core through the slit in the tire.

2. A process of making a tire which consists of forming the same on a collapsible core, then vulcanizing, then slitting the vulcanized tire, circumferentially, at the inner side of the core in a plane oblique to the general plane of the tire, and finally withdrawing the core through the slit in the tire.

3. A process of making a tire which consists of forming a filler by spirally wrapping under uniform tension a length of prepared fabric around a collapsible core, applying tread material to the filler, then vulcanizing, then slitting the vulcanized body, circumferentially, at the inner side of the core, and finally withdrawing the core through the slit.

4. A process of making a tire which consists of forming a filler by spirally wrapping under uniform tension a plurality of lengths of frictional fabric around a collapsible core, said lengths being wrapped in reverse directions, applying tread material to the filler, then vulcanizing, then slitting the vulcanized body, circumferentially, at the inner side of the core, and finally withdrawing the core through the slit.

5. A process of making a tire which consists of spirally wrapping under uniform tension a length of frictional fabric around a collapsible core, applying bead rings to the exterior surface of said wrapped fabric, wrapping a further length of frictional fabric around the core and bead rings in a direction reversed to that of the first wrapping applying tread material to the filler from ring to ring, then vulcanizing, then slitting the vulcanized body, circumferentially, at the inner side of the core, and finally withdrawing the core through the slit.

In testimony whereof, I, FRANKLIN W. KREMER, have signed my name to this specification this 1st day of March, 1916.

FRANKLIN W. KREMER.